(12) United States Patent
Sommer et al.

(10) Patent No.: US 9,836,980 B2
(45) Date of Patent: Dec. 5, 2017

(54) COLLISION AVOIDANCE OF ARBITRARY POLYGONAL OBSTACLES

(71) Applicant: Apple Inc., Cupertino, CA (US)

(72) Inventors: Bruno M. Sommer, Cupertino, CA (US); Norman N. Wang, San Jose, CA (US); Timothy R. Oriol, Cupertino, CA (US); Jacques P. Gasselin de Richebourg, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 166 days.

(21) Appl. No.: 14/732,746

(22) Filed: Jun. 7, 2015

(65) Prior Publication Data

US 2016/0358485 A1 Dec. 8, 2016

(51) Int. Cl.
*G08G 9/02* (2006.01)
*G05D 1/02* (2006.01)
*G01C 21/00* (2006.01)
*B60W 30/09* (2012.01)

(52) U.S. Cl.
CPC ............... *G08G 9/02* (2013.01); *B60W 30/09* (2013.01); *G01C 21/00* (2013.01); *G05D 1/0212* (2013.01)

(58) Field of Classification Search
None
See application file for complete search history.

(56) References Cited

U.S. PATENT DOCUMENTS

| | | |
|---|---|---|
| 6,223,125 B1 | 4/2001 | Hall |
| 6,691,034 B1 | 2/2004 | Patera |
| 8,326,469 B2 | 12/2012 | Phillips |
| 8,791,835 B2 | 7/2014 | Zhang |
| 2011/0077923 A1 | 3/2011 | Bond |

OTHER PUBLICATIONS

Aron Laszka, Annamária R. Várkonyi-Kóczy, Gábor Pék, Péter Várlaki, "Universal autonomous robot navigation using quasi optimal path generation", ICARA, 2009.*

* cited by examiner

*Primary Examiner* — Michelle Chin
(74) *Attorney, Agent, or Firm* — Blank Rome LLP

(57) ABSTRACT

Systems, methods, and computer readable media to improve the operation of graphics systems are described. In general, collision avoidance techniques are disclosed that operate even when the agent lacks a priori knowledge of its environment and is, further, agnostic as to whether the environment is two-dimensional (2D) or three-dimensional (3D), whether the obstacles are convex or concave, or whether the obstacles are moving or stationary. More particularly, techniques disclosed herein use simple geometry to identify which edges of which obstacles an agent is most likely to collide. With this known, the direction of an avoidance force is also known. The magnitude of the force may be fixed, based on the agent's maximum acceleration, and modulated by weighting agents.

21 Claims, 8 Drawing Sheets

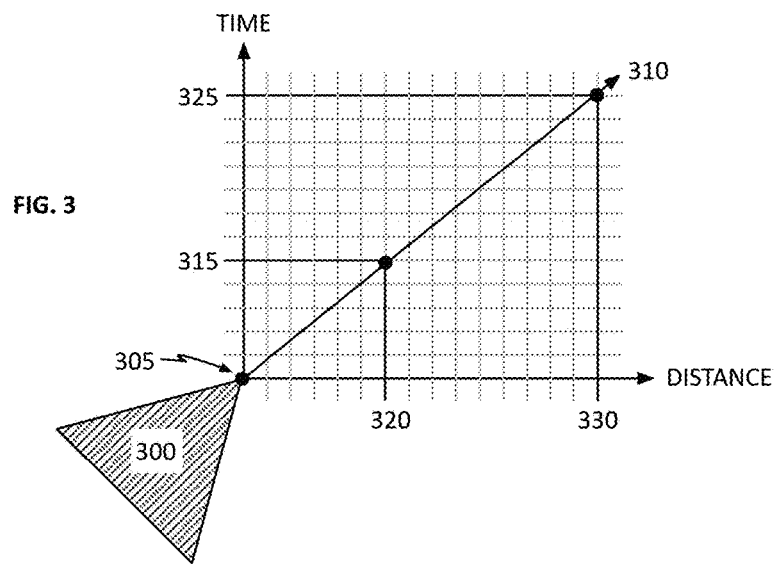
FIG. 3
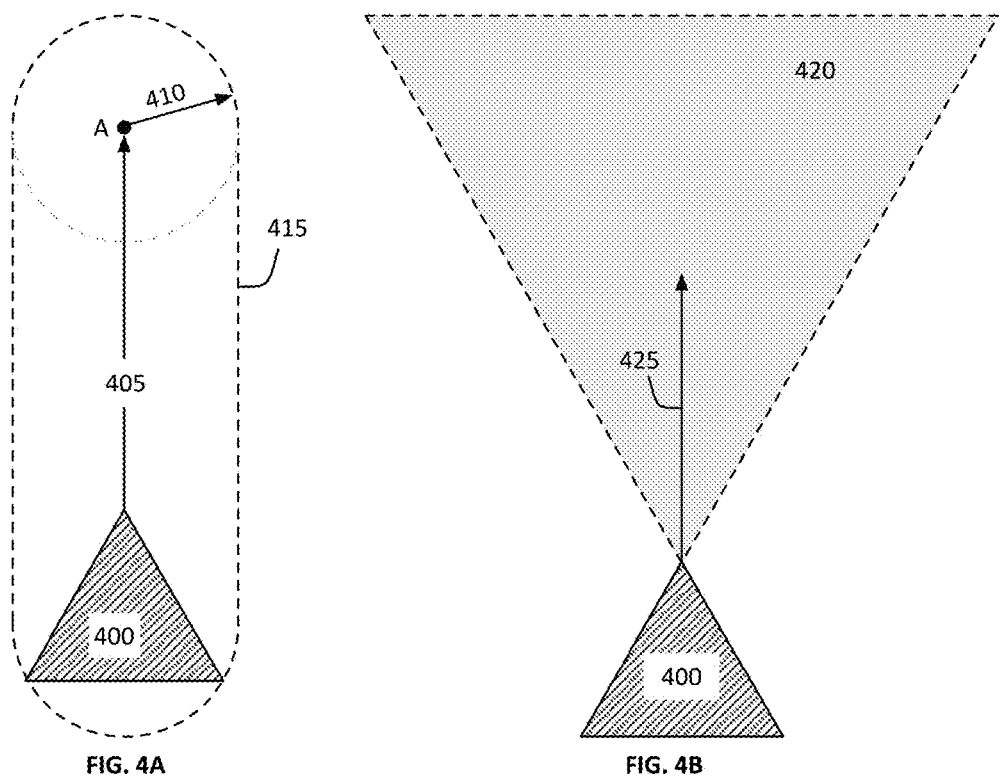
FIG. 4A
FIG. 4B

COLLISION AVOIDANCE OF ARBITRARY POLYGONAL OBSTACLES

BACKGROUND

This disclosure relates generally to the field of computer graphics. More particularly, but not by way of limitation, it relates to a technique for allowing an agent to navigate through an environment without colliding with obstacles therein.

Simulations of multiple agents sharing a common workspace or environment have gained increasing attention for purposes such as crowd simulation, navigating a team of mobile robots, video games, studying natural flocking behavior, traffic engineering, and emergency training simulations. The basic idea behind collision avoidance is to generate a steering force to dodge obstacles every time one is close enough to block the passage. Steering behaviors help autonomous agents move in a realistic manner, by using simple forces that are combined to produce improvisational navigation around the agent's environment.

SUMMARY

In one embodiment the disclosed concepts provide a method for an agent to avoid collisions with obstacles in an environment. The method includes identifying a current position of an agent in an environment; determining a motion vector corresponding to the agent's current position; identifying a first obstacle in the environment, the first obstacle having a plurality of edges; determining a first plurality of edge vectors, each edge vector corresponding to an edge of the first obstacle and extending between a closest point of a corresponding edge and the motion vector, wherein each of the first plurality of edge vectors is orthogonal to its corresponding edge at the corresponding edge's closest point; selecting, from the first plurality of edge vectors, a first edge vector that intersects the motion vector closest to the agent's current position and whose corresponding closest point is within a bounding radius of the agent; determining a first force based on the first edge vector and the motion vector; and applying the first force to the agent. The disclosed method is applicable even when the agent lacks a priori knowledge of its environment, is agnostic as to whether the environment is two-dimensional (2D) or three-dimensional (3D), whether the obstacles are convex or concave, or whether the obstacles are moving or stationary. A computer executable program to implement the method may be stored in any media that is readable and executable by a computer system.

BRIEF DESCRIPTION OF THE DRAWINGS

FIG. 3 illustrates what is meant by look-ahead time in accordance with this disclosure.

FIGS. 4A and 4B illustrate two possible fields of view in accordance with this disclosure.

DETAILED DESCRIPTION

This disclosure pertains to systems, methods, and computer readable media to improve the operation of graphics systems. In general, collision avoidance techniques are disclosed that operate even when the agent lacks a priori knowledge of its environment and is, further, agnostic as to whether the environment is two-dimensional (2D) or three-dimensional (3D), whether the obstacles are convex or concave, or whether the obstacles are moving or stationary. More particularly, techniques disclosed herein use simple geometry to identify which edges of which obstacles an agent is most likely to collide. With this known, the direction of an avoidance force is also known. The magnitude of the force may be fixed, based on the agent's maximum acceleration, and modulated by weighting agents.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of graphics processing systems having the benefit of this disclosure.

Figure 1:
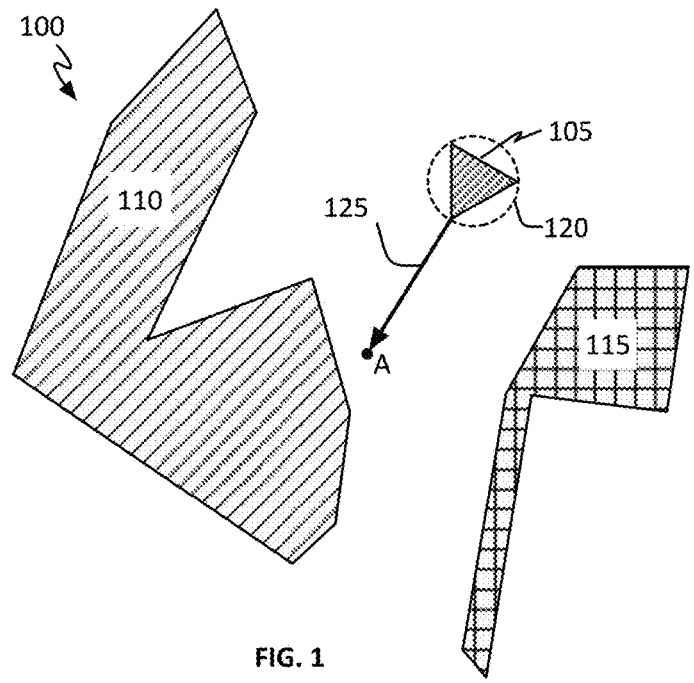
FIG. 1 shows an illustrative operating environment in accordance with one embodiment.

Referring to FIG. 1, environment 100 in accordance with one embodiment may be seen to include agent 105, obstacle 110 and obstacle 115. Also shown is the agent's bounding radius 120 and the agent's current velocity, represented as motion vector 125 (indicating agent 105 will move along path 125 to point A unless perturbed by an applied force). As used herein, the term "agent" may mean any object or body upon which forces may be applied. For example, agent 105 may represent an automobile, person, animal (real or imaginary), or a drop of oil flowing through water. The term "obstacle" may mean any simple (non-self-intersecting) polygon or polyhedron and may be convex or concave. The term "bounding radius" means any shape (2D) or volume (3D) that is used to capture or represent a agent's size. Further, within the context of a computer simulation or environment 100, agents (e.g., agent 105) have forces applied to them (or by them), and the results of those forces determined and manifest in environment 100 on a regular basis (e.g., 30 to 60 times per second). Operations in accordance with this disclosure are directed to providing a means for an agent to avoid collisions with obstacles in its environment without a priori knowledge of that environment: e.g., where the obstacles are located, the shape of such obstacles (e.g., convex or concave), and whether the obstacles are in motion and, if so, to what degree they are moving.

Figure 2:
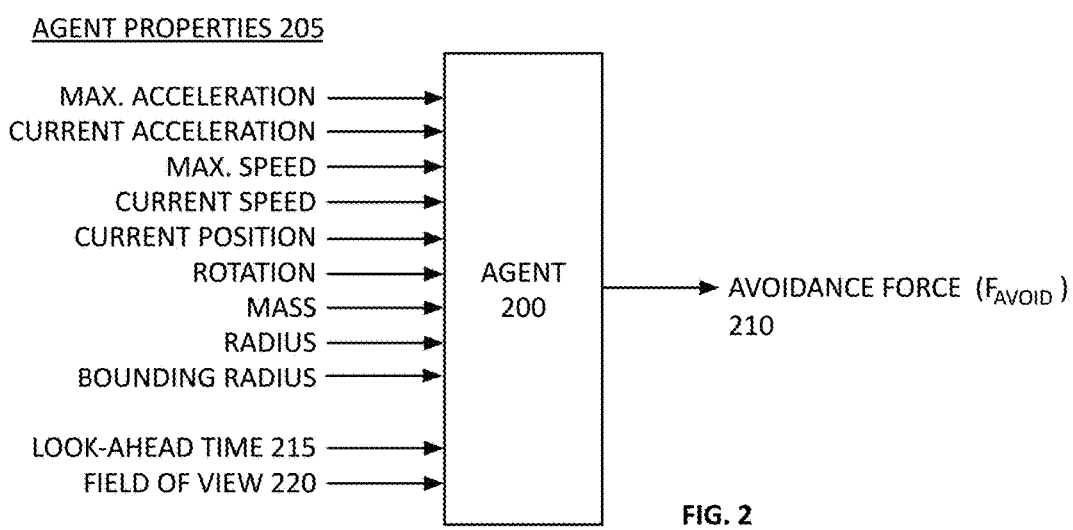
FIG. 2 shows, in block diagram form, an agent in accordance with one embodiment.

Referring to FIG. 2, agent 200 in accordance with one embodiment may be modeled as an object having input properties 205 and an output that is indicative of a force (avoidance force 210) needed by the agent to avoid collision with an object in its environment—if possible. While most properties 205 identify input parameters whose functions are obvious by name (e.g., mass) or already described (e.g., "bounding radius"), look-ahead time 215 and field of view 220 represent parameters that may be unique or used in a manner that is not generally known to those of ordinary skill in the art.

Look-ahead time 215 specifies an agent's ability to look forward in time in its environment. By way of example and referring to FIG. 3, if agent 300 has current position 305 and motion vector 310, having look-ahead time 315 permits agent 300 to determine its location anywhere between its current location 305 and location 320. Instead, if the agent's look-ahead time is 325, it may determine its location anywhere between its current location 305 and location 330. From this description it follows that given an unbounded amount of look-ahead time any agent may successfully avoid collision with any obstacle if such action is possible. Collision avoidance operations in accordance with this disclosure are specifically directed to those cases where such knowledge is not available.

Field of view refers to or specifies the contour of an agent's visual region. By way of example and referring to FIG. 4A, if agent 400 is moving from its current location to point A in accordance with motion vector 405 using its bounding radius 410 to define its field of view, capsule 415 defines that area or region within which agent 400 can see, recognize and respond to elements in its environment. Referring to FIG. 4B, if agent 400 has a conical field of view, then it may see, recognize and respond to elements within region 420 as it moves along motion vector 425. It should be understood that while capsule 415 and cone 420 have been presented as 2D, they may also be 3D. That is, capsule 415 may define a cylinder in 3-space while cone 420 may define a pyramid in 3-space. It should also be recognized that the size of capsule 415 or cone 420 may depend upon the agent's motion vector and look-ahead time. Further, it will be recognized that capsule 415 and cone 420 are but two examples of many possible different field of view regions.

In the following a collision avoidance operation in accordance with one embodiment will be described in terms of the flowcharts provided in FIGS. 5A-5B. Certain steps of this illustrative operation may be highlighted by FIGS. 6A-6B which show how two agents having different fields of view moving through a common environment may effect different obstacle avoidance actions. By way of introduction, both FIGS. 6A and 6B show common environment 600 having agent 605 and obstacles 610 and 615. In FIG. 6A, agent 605 has a capsule 620 field of view and in FIG. 6B, agent 605 has conical field of view 625. (It should be understood that FIGS. 6A and 6B are provided as examples of what type of environment a collision avoidance operation in accordance with this disclosure is directed. FIGS. 6A and 6B should therefore be understood as illustrative, not limiting.)

Figure 5A:
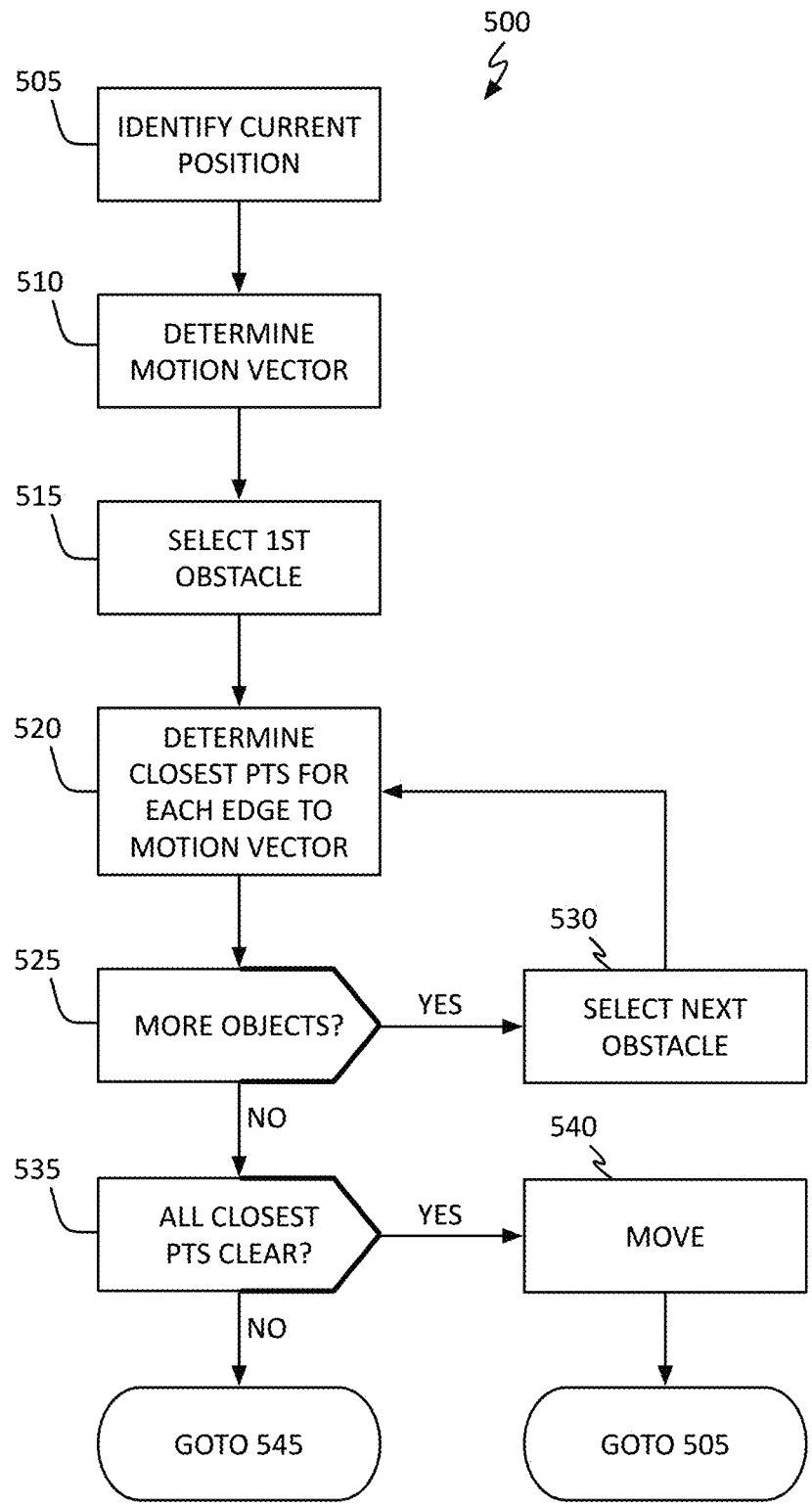
FIGS. 5A-5B show, in flowchart form, a collision avoidance operation in accordance with one embodiment.
Figure 6A:
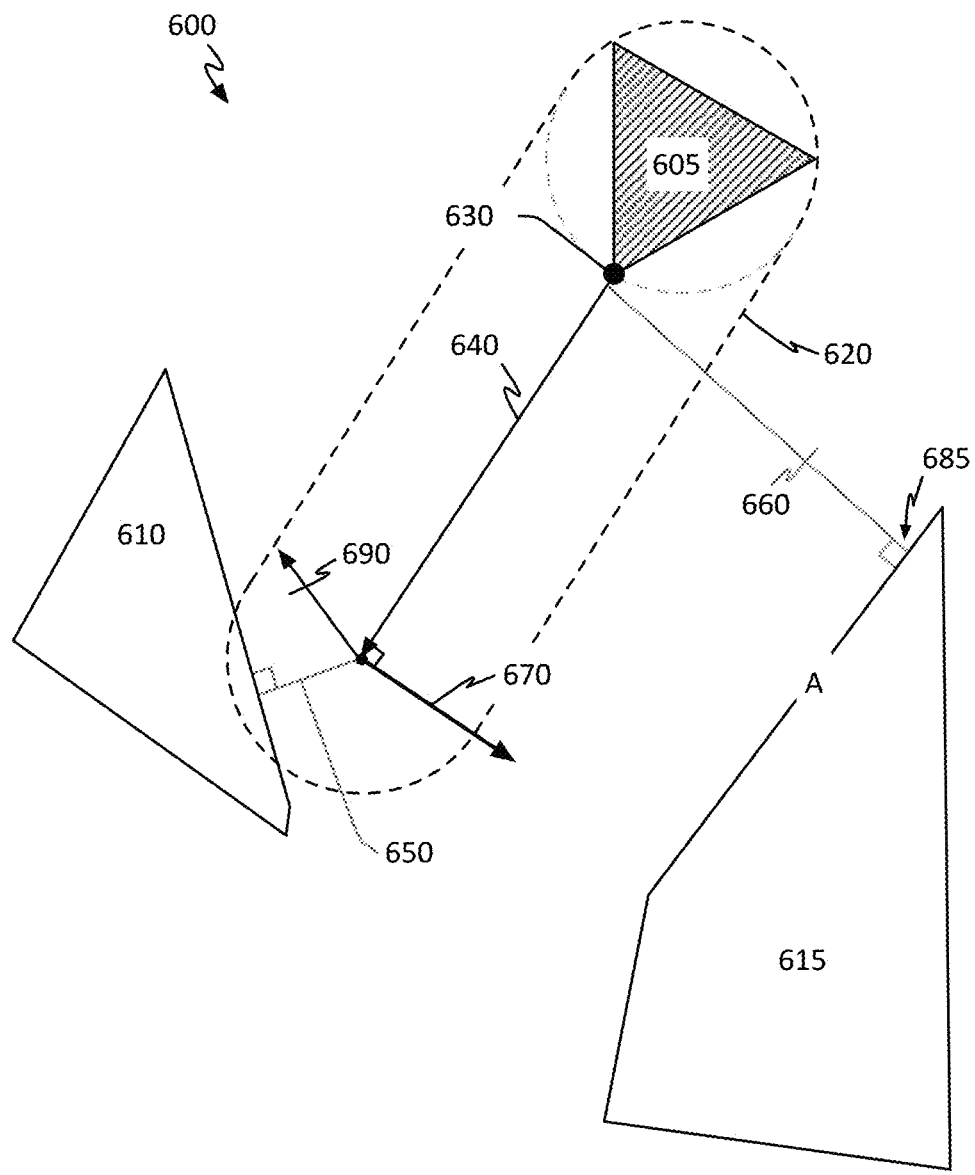
FIGS. 6A and 6B illustrate how two agents having different fields of view moving through a common environment may effect different obstacle avoidance actions in accordance with one embodiment.
Figure 6B:
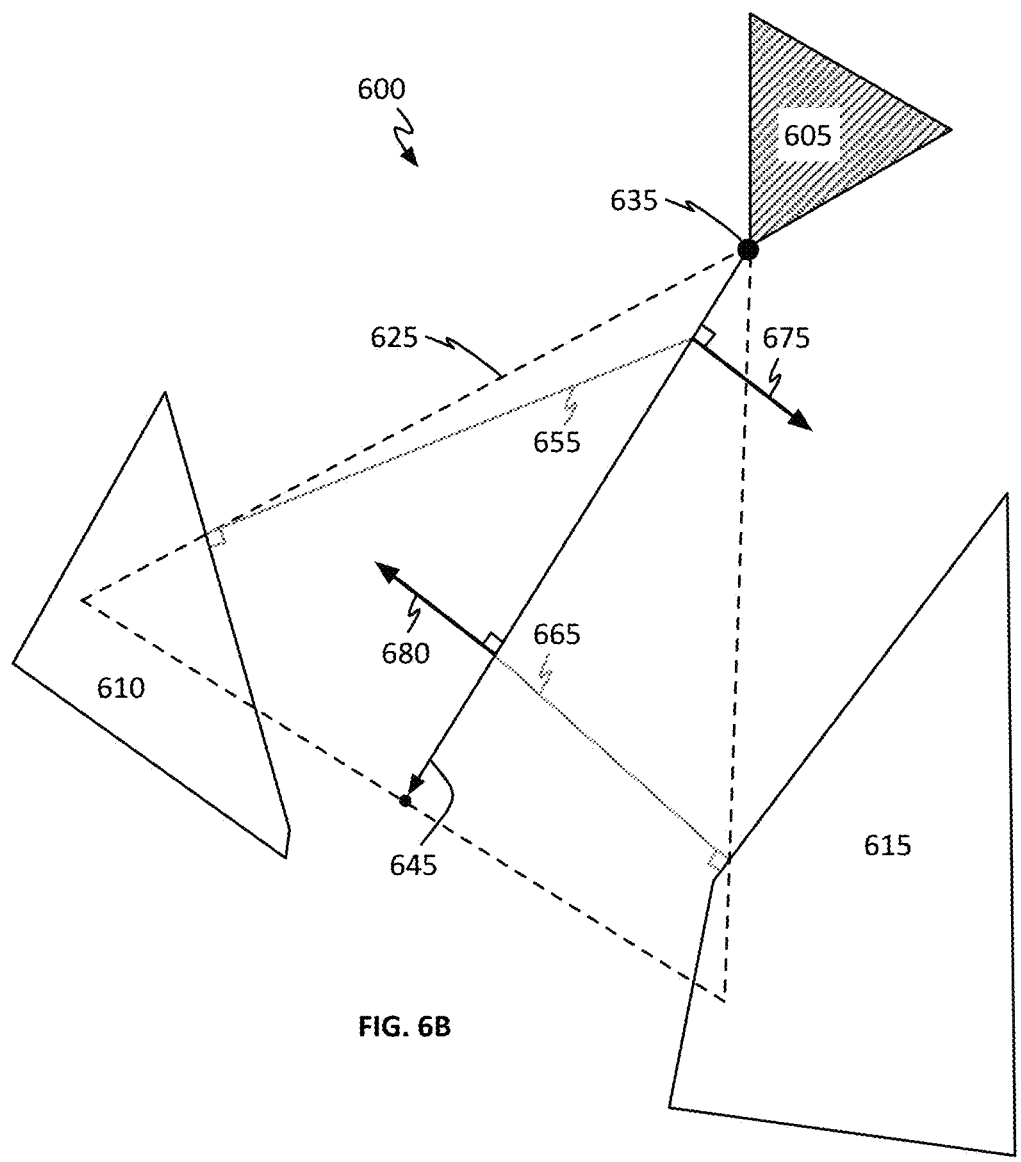

Referring now to FIG. 5A, collision avoidance operation 500 in accordance with one embodiment may begin with an agent determining its current position (block 505): see FIG. 6A at 630 and FIG. 6B at 635. Next, the agent's motion vector may be determined (block 510): see FIG. 6A at 640 and FIG. 6B at 645. In one embodiment this could be as straightforward as calculating the agent's: (current velocity)×(look-ahead time). As previously noted, operating environments such as environments 100 and 600 are often updated on a regular basis such as 15, 30 or 60 times per-second. At each such period, the agent may determine whether it could collide with one or more obstacles. In general, for each obstacle in the environment the distance between the closest point from each of its edges to the agent's motion vector may be determined and if any of these distances are less than the agent's bounding radius, a potential collision could occur (blocks 515-530). More specifically, a first obstacle may be selected (block 515) and the distance between the closest point on each of the obstacle's edges to the agent's motion vector may be determined in any convenient manner desired—the line segment extending from the edge's closest point to the motion vector and the motion vector hereinafter referred to as the edge vector (block 520): see FIG. 6A at 650 and FIG. 6B at 655 (obstacle 610). With all edges of a first obstacle complete, if another obstacle exists in the environment (the "YES" prong of block 525), the next obstacle may be selected (block 530), where after operation 500 continues at block 520: see FIG. 6A at 660 and FIG. 6B at 665 (obstacle 615). Once all obstacles have been visited (the "NO" prong of block 525), a check may be made to determine if any of the length vectors identified during block 520 is less than the agent's bounding radius (block 535): see FIG. 6A at 650 and FIG. 6B at 655 and 665. Said differently, a check may be made to determine if any of the edge vectors have their closest points within the agent's field of view. If all of the identified edge vectors are longer than the agent's bounding radius or their corresponding closest points lie outside the agent's field of vision (the "YES" prong of block 535), the agent may simply move in accordance with its motion vector (block 540), after which collision avoidance operation 500 may begin anew at block 505. For example, consider edge vector 660 of FIG. 6A. Given 660 represents an edge vector from edge A's closest point 685 to motion vector 640, it can be said that object 615 does not pose a collision risk to agent 605 because the length of edge vector 660 is greater than the length of agent 605's bounding radius 690 (alternatively, it may be noted that edge vector 660's corresponding closest point 685 is outside capsule 620).

Figure 5B:
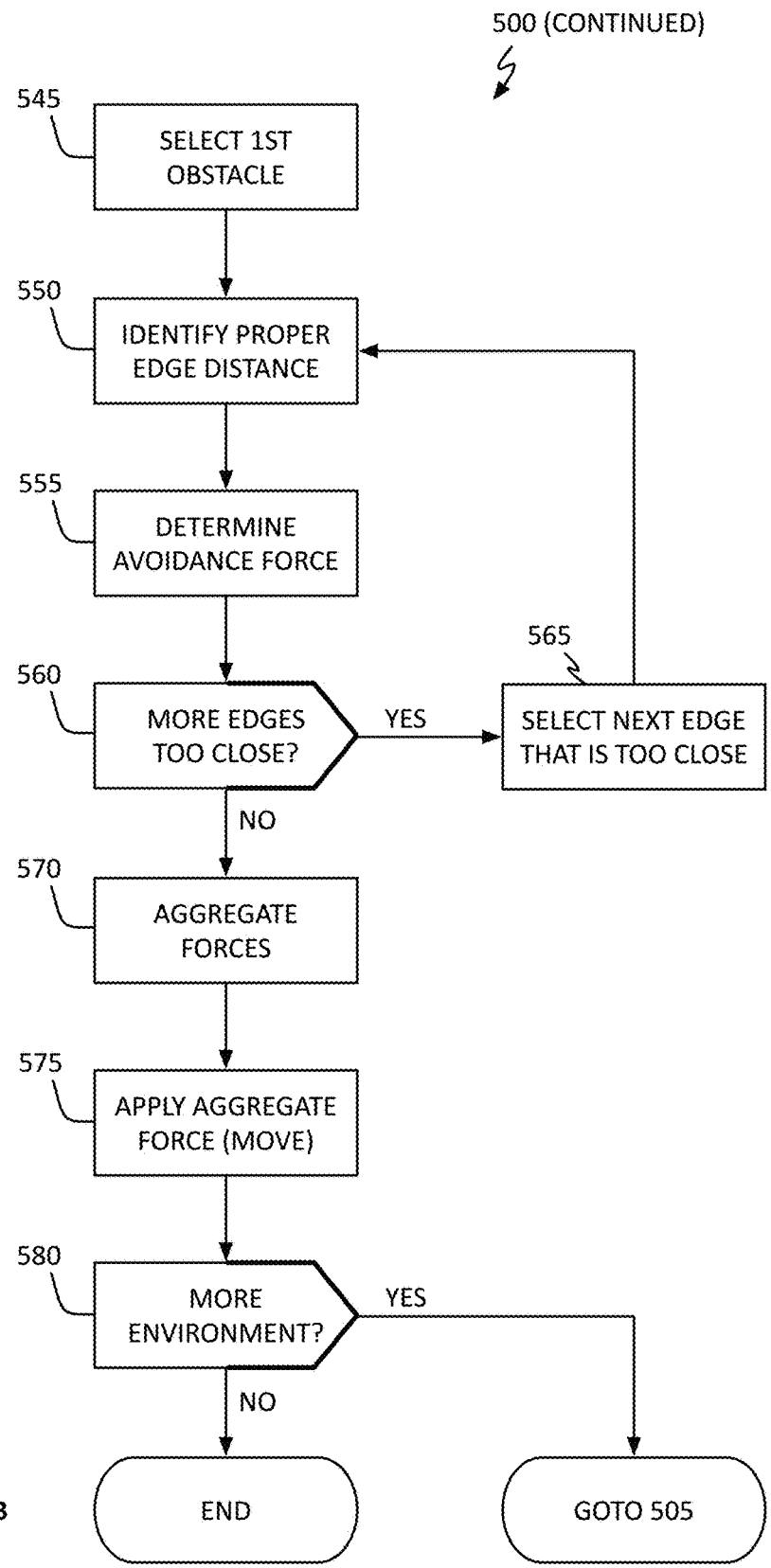

If there is at least one edge vector that is less/shorter than the agent's bounding radius or whose corresponding closest points lie within the agent's field of view (the "NO" prong of block 535), operation 500 continues at FIG. 5B where a first of the obstacles may be selected (block 545): see FIGS. 6A and 6B at obstacle 610. For the selected obstacle, the edge vector that intersects the agent's motion vector closest to the agent's current position may be selected (block 550): see FIG. 6A at edge distance 550 and FIG. 6B at edge distance 655. Next, the force necessary to avoid the selected obstacle may be determined (block 555). The direction of this force may be orthogonal to the motion vector at that location (time) where the edge vector intersects the motion vector: see FIG. 6A at 670 and FIG. 6B at 675. In one embodiment the amount or magnitude of the force may be expressed as:

$$F_{AVOID} = m_a a_a \omega_{OBSTACLE}, \quad \text{EQ. 3.}$$

where $F_{AVOID}$ represents the force needed to avoid the obstacle, $m_a$ represents the agent's mass, $a_a$ represents the agent's acceleration, and $\omega_{OBSTACLE}$ represents the obstacle's avoidance priority. In one embodiment, the agent's acceleration may be taken as the agent's maximum acceleration (see FIG. 2). In another embodiment, the agent's acceleration could be based on the length of the edge vector. In practice, any modulation of the agent's acceleration that is determined to satisfy the system's requirements may be used. By way of example, if all obstacles are to be treated equally vis à vis avoiding collision therewith, all obstacle's avoidance priorities may be set to 1. In another embodiment, if there are 2 obstacles one may have an obstacle avoidance priority of 1.0 while another may have a priority of 0.9. Again, any system of assigning weights to provide the desired system behavior may be used.

If there are additional obstacles to evaluate (the "YES" prong of block 560, a next obstacle may be selected (block 565), where after the avoidance force for the next obstacle may be determined: see FIG. 6B at 680. It should be noted that in FIG. 6B the agent's conical field of view identifies two obstacles to avoid at the same time. The first having avoidance force 675 in a first direction and avoidance force 680 in a second and opposite direction. Once all obstacles have been accounted for (the "NO" prong of block 560), all of the agent's avoidance forces may be combined or aggregated (block 570). In one embodiment, combined forces may be normalized to a desired range (e.g., 0 to 1). The aggregated force may then be applied to the agent (block 575). Finally, a check may be made to determine if the agent has more environment to navigate. If it does (the "YES" prong of block 580), collision avoidance operation 500 continues at block 505. If the agent has passed through the prescribed environment (the "NO" prong of block 580), operation 500 may terminate.

It is noted again that collision avoidance operations in accordance with this disclosure are applicable to 2D and 3D environments, are indifferent to whether the obstacles are convex or concave, and are agnostic as to whether the obstacles are moving or stationary. Even with these advantages, it should be noted that boundary conditions may need to be checked. For example, if the agent starts inside an obstacle, the approach described herein does not generally work. Accordingly, a boundary check may need to be put in place should it be possible for the agent to enter an obstacle. In some embodiments an agent's look-ahead time and field of view may be used to simulate agent intelligence (or un-intelligence). In still other embodiments conical fields of view need not be oriented straight down a agent's current motion vector (such as that illustrated in FIG. 6B). Instead, conical (or other shaped) fields of view may be pointed to some future position of the agent based on, for example: future velocity (current acceleration×look-ahead time); and future position (e.g., future velocity×look-ahead time). The cone may then be oriented such that the future position is in the cone.

Figure 7:
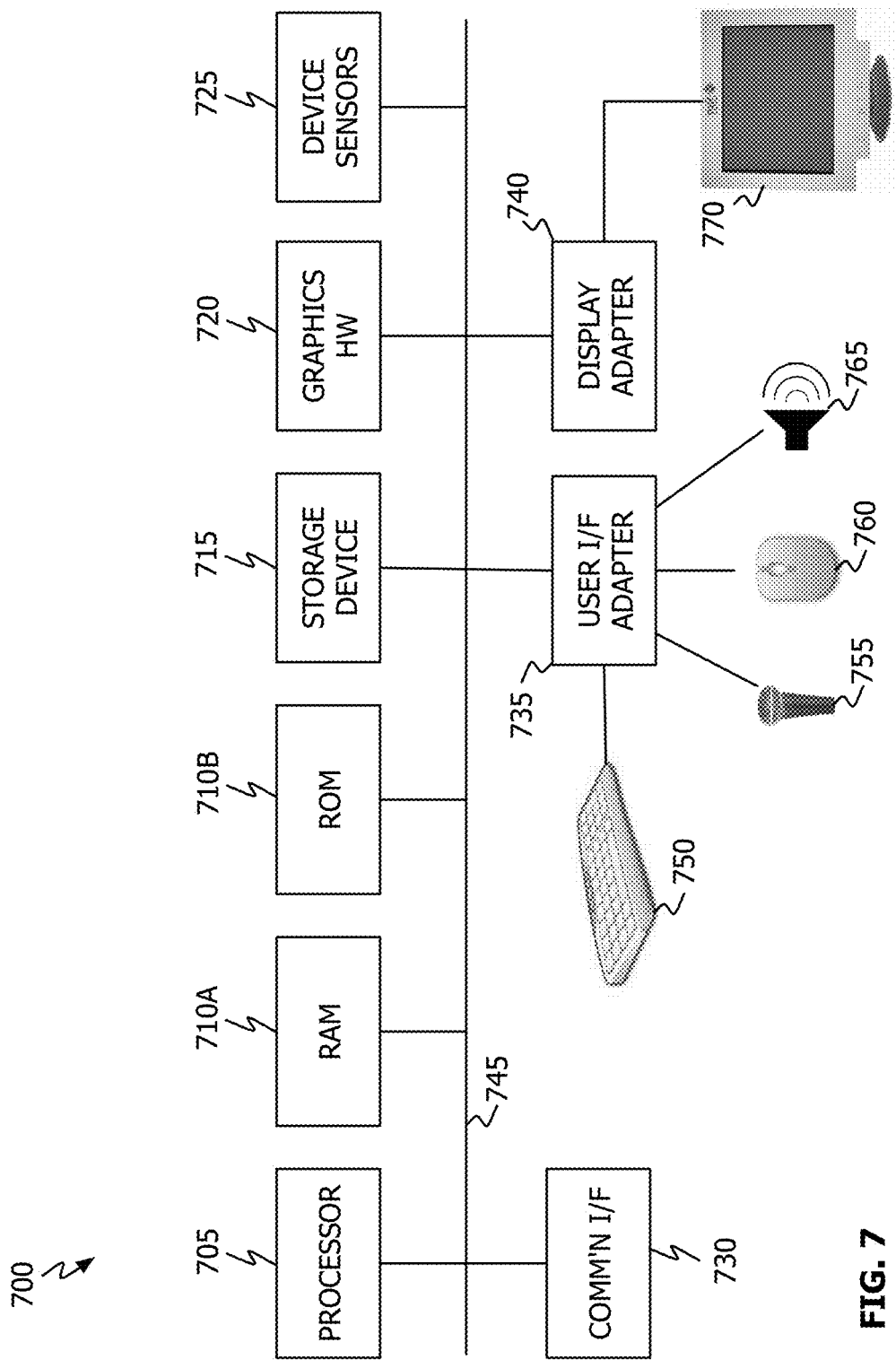
FIG. 7 shows, in block diagram form, a computer system in accordance with one embodiment.

Referring to FIG. 7, the disclosed collision avoidance operations may be performed by representative computer system 700 (e.g., a general purpose computer system such as a desktop, laptop, notebook or tablet computer system). Computer system 700 may include one or more processors 705, memory 710 (710A and 710B), one or more storage devices 715, graphics hardware 720, device sensors 725 (e.g., 3D depth sensor, proximity sensor, ambient light sensor, accelerometer and/or gyroscope), communication interface 730, user interface adapter 735 and display adapter 740—all of which may be coupled via system bus or backplane 745 which may be comprised of one or more continuous (as shown) or discontinuous communication links. Memory 710 may include one or more different types of media (typically solid-state) used by processor 705 and graphics hardware 720. For example, memory 710 may include memory cache, read-only memory (ROM), and/or random access memory (RAM). Storage 715 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 710 and storage 715 may be used to retain media (e.g., audio, image and video files), preference information, device profile information, computer program instructions or code organized into one or more modules and written in any desired computer programming language, and any other suitable data. When executed by processor(s) 705 and/or graphics hardware 720 such computer program code may implement one or more of the methods described herein. Communication interface 730 may be used to connect computer system 700 to one or more networks. Illustrative networks include, but are not limited to, a local network such as a USB network, an organization's local area network, and a wide area network such as the Internet. Communication interface 730 may use any suitable technology (e.g., wired or wireless) and protocol (e.g., Transmission Control Protocol (TCP), Internet Protocol (IP), User Datagram Protocol (UDP), Internet Control Message Protocol (ICMP), Hypertext Transfer Protocol (HTTP), Post Office Protocol (POP), File Transfer Protocol (FTP), and Internet Message Access Protocol (IMAP)). User interface adapter 735 may be used to connect keyboard 750, microphone 755, pointer device 760, speaker 765 and other user interface devices such as a touch-pad and/or a touch screen (not shown). Display adapter 740 may be used to connect one or more display units 770 which may provide touch input capability. Processor 705 may be a system-on-chip such as those found in mobile devices and include one or more dedicated graphics processing units (GPUs). Processor 705 may be based on reduced instruction-set computer (RISC) or complex instruction-set computer (CISC) architectures or any other suitable architecture and may include one or more processing cores. Graphics hardware 720 may be special purpose computational hardware for processing graphics and/or assisting processor 705 perform computational tasks. In one embodiment, graphics hardware 720 may include one or more programmable GPUs and each such unit may include one or more processing cores.

Figure 8:
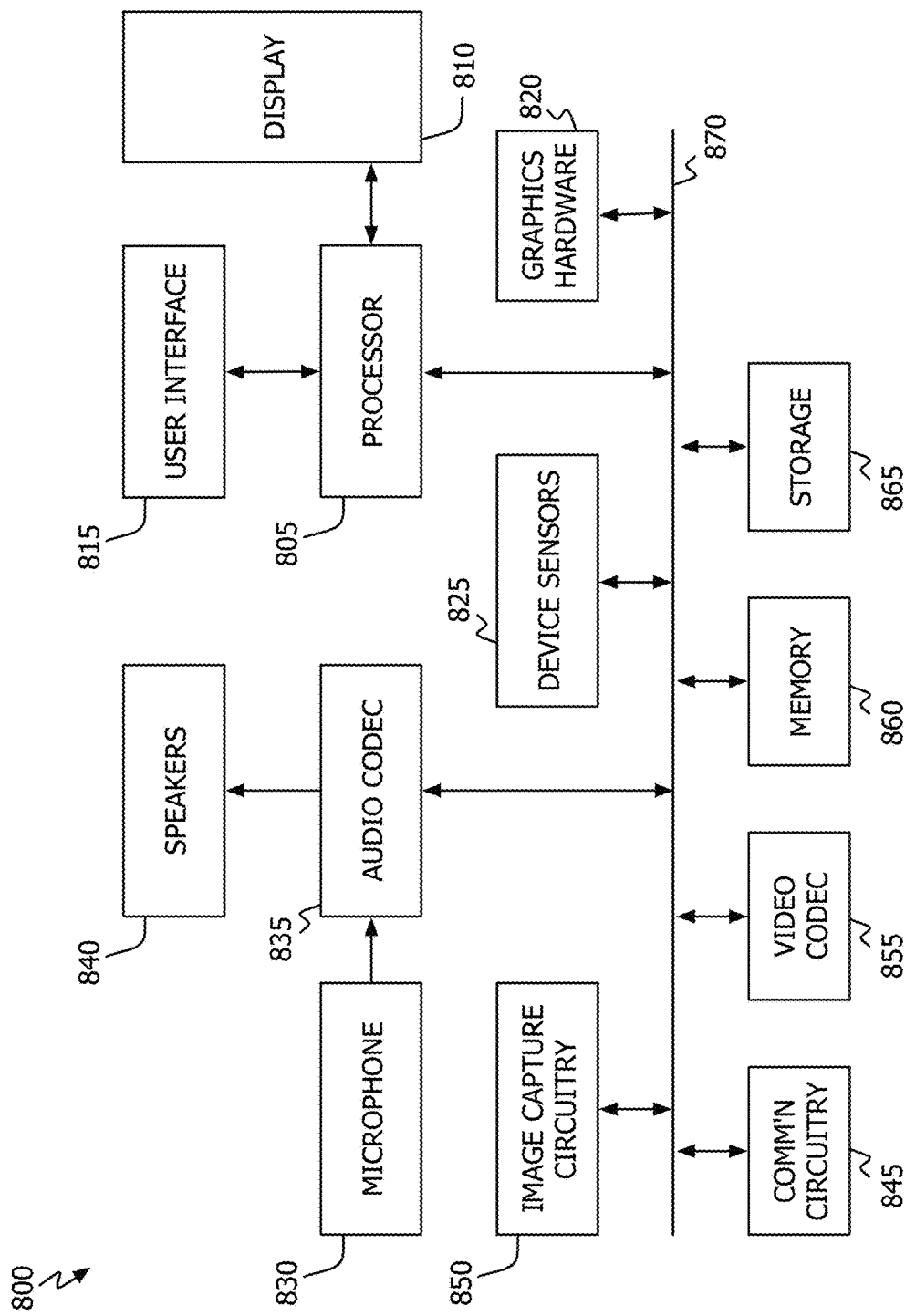
FIG. 8 shows, in block diagram form, a multi-function electronic device in accordance with one embodiment.

Referring to FIG. 8, a simplified functional block diagram of illustrative mobile electronic device 800 is shown according to one embodiment. Electronic device 800 could be, for example, a mobile telephone, personal media device, a notebook computer system, or a tablet computer system. As shown, electronic device 800 may include processor 805, display 810, user interface 815, graphics hardware 820, device sensors 825 (e.g., proximity sensor/ambient light sensor, accelerometer and/or gyroscope), microphone 830, audio codec(s) 835, speaker(s) 840, communications circuitry 845, image capture circuit or unit 850, video codec(s) 855, memory 860, storage 865, and communications bus 870.

Processor 805, display 810, user interface 815, graphics hardware 820, device sensors 825, communications circuitry 845, memory 860 and storage 865 may be of the same or similar type and serve the same function as the similarly named component described above with respect to FIG. 7. Audio signals obtained via microphone 830 may be, at least partially, processed by audio codec(s) 835. Data so captured may be stored in memory 860 and/or storage 865 and/or output through speakers 840. Image capture circuitry 850 may capture still and video images. Output from image capture circuitry 850 may be processed, at least in part, by video codec(s) 855 and/or processor 805 and/or graphics hardware 820, and/or a dedicated image processing unit incorporated within circuitry 850. Images so captured may be stored in memory 860 and/or storage 865.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). For example, FIG. 5 shows a flowchart illustrating a collision avoidance in accordance with one embodiment. In one or more embodiments, one or more of the disclosed steps may be omitted, repeated, and/or performed in a different order than that described herein. Accordingly, the specific arrangement of steps or actions shown in FIG. 5 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A collision avoidance method, comprising:
    identifying a current position of an agent in an environment, the environment stored in a memory and displayed on a display unit;
    determining a motion vector corresponding to the agent's current displayed position;
    identifying a first obstacle in the environment, the first obstacle having a plurality of edges;
    determining a first plurality of edge vectors, each edge vector corresponding to an edge of the first obstacle and extending between a closest point of a corresponding edge and the motion vector, wherein each of the first plurality of edge vectors is orthogonal to its corresponding edge at the corresponding edge's closest point;
    selecting, from the first plurality of edge vectors, a first edge vector that intersects the motion vector closest to the agent's current displayed position and whose corresponding closest point is within a bounding radius of the agent;
    determining a first force based on the first edge vector and the motion vector;
    applying the first force to the agent to change the motion vector corresponding to the agent's current displayed position; and
    updating, on the display unit, the displayed environment in response to the applied first force.

2. The method of claim 1, wherein the first obstacle comprises a three-dimensional (3D) representation of an obstacle.

3. The method of claim 1, wherein the first obstacle comprises an obstacle that is in motion with respect to the displayed environment.

4. The method of claim 1, wherein the bounding radius comprises a field of view of the agent.

5. The method of claim 1, wherein identifying a first obstacle further comprises:
    identifying a second obstacle in the environment, the second obstacle having a plurality of edges;
    determining a second plurality of edge vectors, each edge vector corresponding to an edge of the second obstacle and extending between a closest point of a corresponding edge and the motion vector, wherein each of the second plurality of edge vectors is orthogonal to its corresponding edge at the corresponding edge's closest point;
    selecting a second edge vector, from the second plurality of edge vectors, that intersects the motion vector closest to the agent's current displayed position and whose corresponding closest point is within a bounding radius of the agent; and
    determining a second force based on the second edge vector and the motion vector.

6. The method of claim 5, wherein determining a first force further comprises:
    determining a second force based on the second edge vector and the motion vector; and
    combining the first and second forces to generate an aggregate force.

7. The method of claim 6, wherein:
    applying the first force comprises applying the aggregate force to the agent to change the motion vector corresponding to the agent's current displayed position; and
    the updating comprises updating, on the display unit, the displayed environment in response to the applied aggregate force.

8. A computer system, comprising:
    a memory;
    a display unit coupled to the memory; and
    one or more processors coupled to the memory and the display unit and configured to execute program code stored in the memory to cause the one or more processors to—
        access an environment stored in the memory,
        identify a current position of an agent in the environment,
        determine a motion vector corresponding to the agent's current position,
        identify a first obstacle in the environment, the first obstacle having a plurality of edges,
        determine a first plurality of edge vectors, each edge vector corresponding to an edge of the first obstacle and extending between a closest point of a corresponding edge and the motion vector, wherein each of the first plurality of edge vectors is orthogonal to its corresponding edge at the corresponding edge's closest point,
        select, from the first plurality of edge vectors, a first edge vector that intersects the motion vector closest to the agent's current position and whose corresponding closest point is within a bounding radius of the agent,
        determine a first force based on the first edge vector and the motion vector,
        apply the first force to the agent, and
        display a result of the first force on the agent on the display unit.

9. The computer system of claim 8, wherein the first obstacle comprises a representation of a simple polyhedron.

10. The computer system of claim 8, wherein the first obstacle comprises an obstacle that is in motion.

11. The computer system of claim 8, wherein the bounding radius comprises a field of view of the agent.

12. The computer system of claim 8, wherein the program code to cause the one or more processors to identify a first obstacle further comprise program code to cause the one or more processors to:
    identify a second obstacle in the environment, the second obstacle having a plurality of edges;
    determine a second plurality of edge vectors, each edge vector corresponding to an edge of the second obstacle and extending between a closest point of a corresponding edge and the motion vector, wherein each of the second plurality of edge vectors is orthogonal to its corresponding edge at the corresponding edge's closest point;
    select, from the second plurality of edge vectors, a second edge vector that intersects the motion vector closest to the agent's current position and whose corresponding closest point is within a bounding radius of the agent; and
    determine a second force based on the second edge vector and the motion vector.

13. The computer system of claim 12, wherein the program code to cause the one or more processors to determine a first force further comprise the program code to cause the one or more processors to:
    determine a second force based on the second edge vector and the motion vector; and
    combine the first and second forces to generate an aggregate force.

14. The computer system of claim 13, wherein the program code to cause the one or more processors to apply the first force comprise program code to cause the one or more processors to:
    apply the aggregate force to the agent; and
    display, on the display unit, a result of applying the aggregate force to the agent.

15. A non-transitory program storage device comprising instructions stored thereon to cause one or more processors to:
    access an environment stored in memory;
    identify a current position of an agent in the environment;
    determine a motion vector corresponding to the agent's current position;
    identify a first obstacle in the environment, the first obstacle having a plurality of edges;
    determine a first plurality of edge vectors, each edge vector corresponding to an edge of the first obstacle and extending between a closest point of a corresponding edge and the motion vector, wherein each of the first plurality of edge vectors is orthogonal to its corresponding edge at the corresponding edge's closest point;
    select, from the first plurality of edge vectors, a first edge vector that intersects the motion vector closest to the agent's current position and whose corresponding closest point is within a bounding radius of the agent;
    determine a first force based on the first edge vector and the motion vector; and
    apply the first force to the agent.

16. The non-transitory program storage device of claim 15, wherein the first obstacle comprises a representation of a simple polyhedron.

17. The non-transitory program storage device of claim 15, wherein the first obstacle comprises an obstacle that is in motion.

18. The non-transitory program storage device of claim 15, wherein the bounding radius comprises a field of view of the agent.

19. The non-transitory program storage device of claim 15, wherein the instructions to cause the one or more processors to identify a first obstacle further comprise instructions to cause the one or more processors to:
    identify a second obstacle in the environment, the second obstacle having a plurality of edges;
    determine a second plurality of edge vectors, each edge vector corresponding to an edge of the second obstacle and extending between a closest point of a corresponding edge and the motion vector, wherein each of the second plurality of edge vectors is orthogonal to its corresponding edge at the corresponding edge's closest point;
    select, from the second plurality of edge vectors, a second edge vector that intersects the motion vector closest to the agent's current position and whose corresponding closest point is within a bounding radius of the agent; and
    determine a second force based on the second edge vector and the motion vector.

20. The non-transitory program storage device of claim 19, wherein the instructions to cause the one or more processors to determine a first force further comprise instructions to cause the one or more processors to:
    determine a second force based on the second edge vector and the motion vector; and
    combine the first and second forces to generate an aggregate force.

21. The non-transitory program storage device of claim 20, wherein the instructions to cause the one or more processors to apply the first force comprise instructions to cause the one or more processors to:
    apply the aggregate force to the agent; and
    display, on a display unit, a result of applying the aggregate force to the agent.

* * * * *